UNITED STATES PATENT OFFICE.

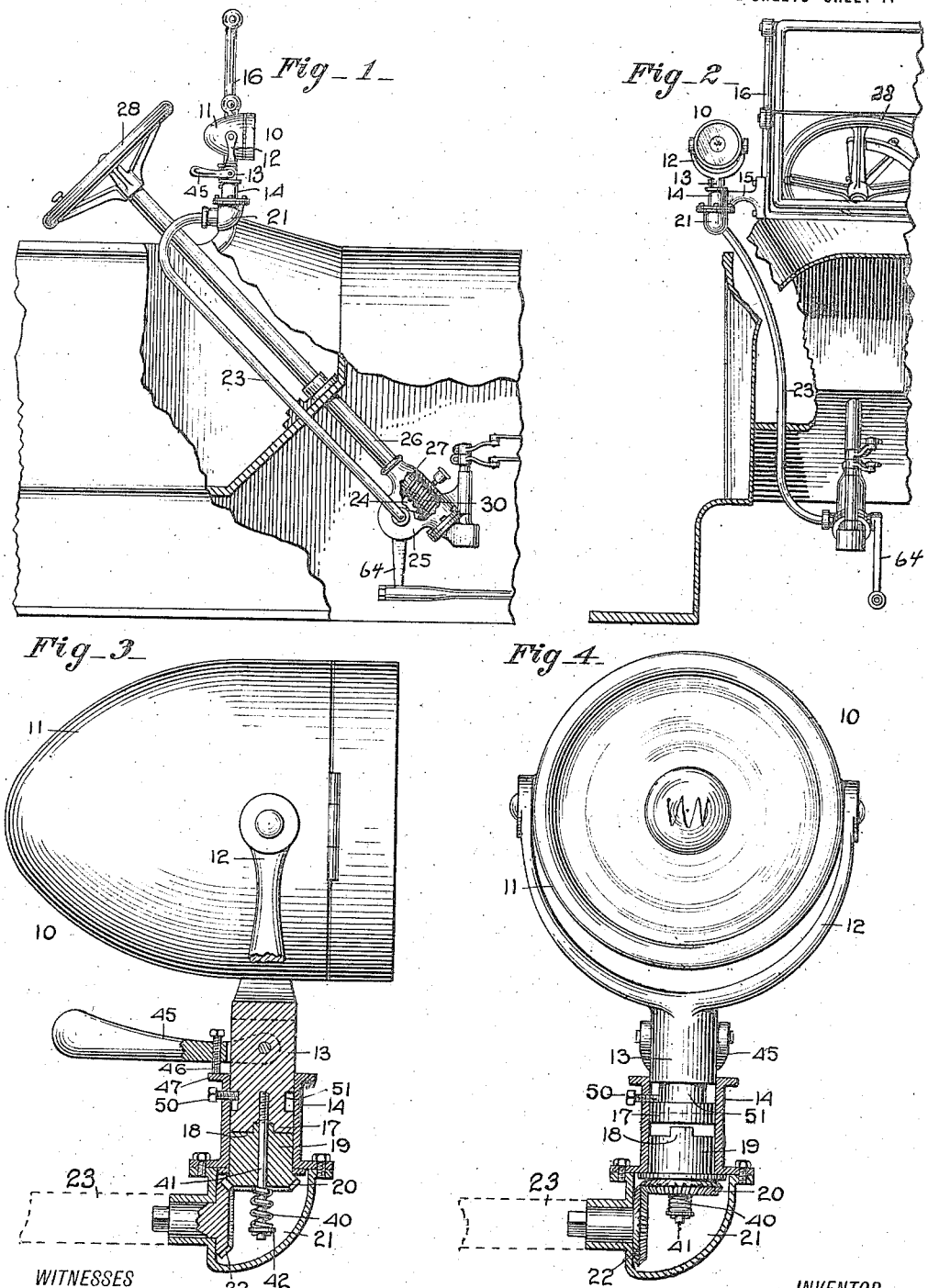

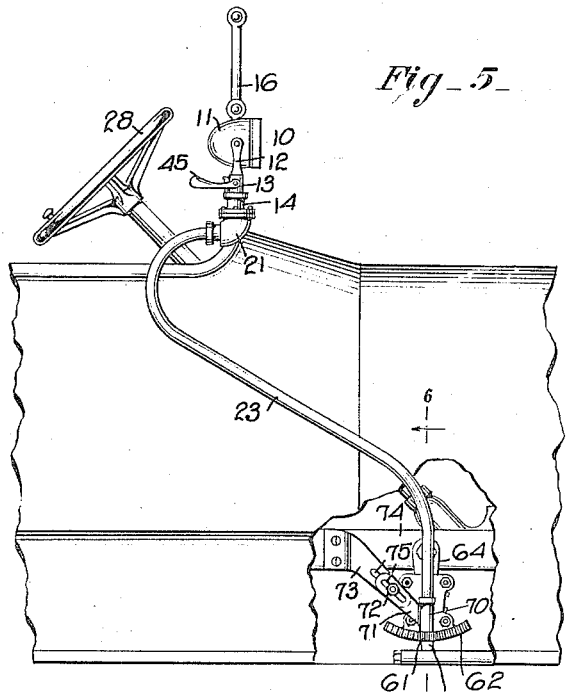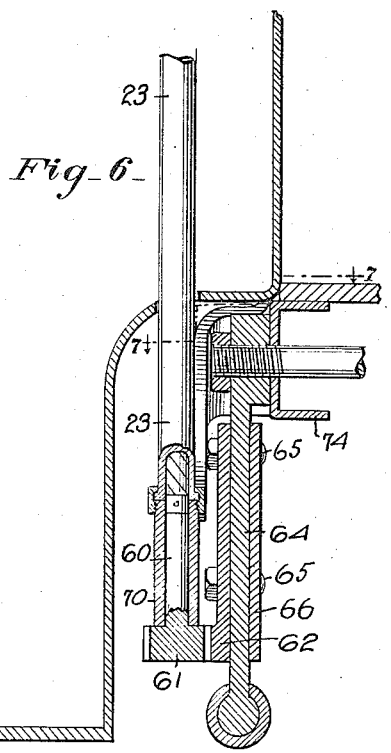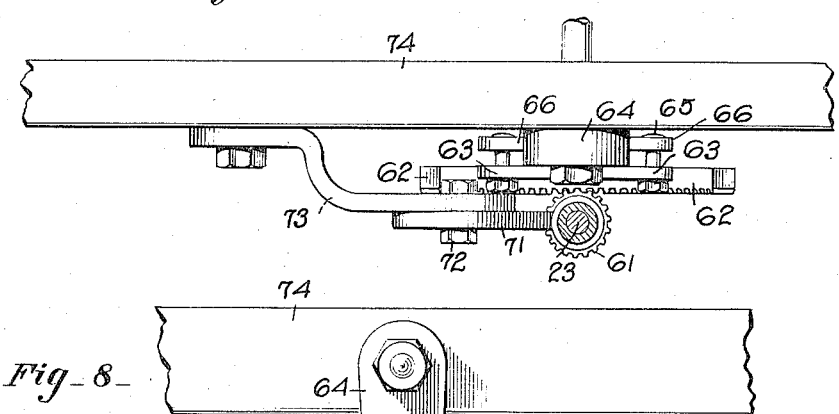

GILBERT HENRY JOHNSON, JR., OF NEW YORK, N. Y.

ADJUSTABLE SPOT-LIGHT.

1,192,527.

Specification of Letters Patent.

Patented July 25, 1916.

Application filed November 5, 1915. Serial No. 59,761.

*To all whom it may concern:*

Be it known that I, GILBERT H. JOHNSON, Jr., a citizen of the United States, and a resident of the city of New York, Spuyten Duyvil, borough of Manhattan, in the county and State of New York, have invented a new and Improved Adjustable Spot-Light, of which the following is a full, clear, and exact description.

The object of the invention is to provide a new and improved adjustable spot light for use on automobiles and similar vehicles, and arranged to automatically turn with the steering wheels to illuminate the roadway ahead on making turns and to permit the driver to turn the spot light independently of the automatic control to illuminate signs and the like alongside the roadway, or license numbers and the like on passing vehicles.

In order to accomplish the desired result use is made of a lamp mounted to turn on a vertical axis, an automatic control connected with the said lamp and with the steering gear of the vehicle, and manually controlled means connected with the said lamp for disengaging the latter from the automatic control and for turning it in either direction independently of the steering gear.

A practical embodiment of the invention is represented in the accompanying drawings forming a part of this specification, in which similar characters of reference indicate corresponding parts in all the views.

Figure 1 is a side elevation of the adjustable spot light as applied to an automobile, part being shown in section; Fig. 2 is a front elevation of the same with parts of the automobile in cross section; Fig. 3 is an enlarged side elevation of the spot light and with the operating mechanism shown in section; Fig. 4 is a front view of the same with parts in section and the lamp disengaged from the automatic control; Fig. 5 is a side elevation of the adjustable spot light as applied to an automobile and showing a modified form of the automatic control; Fig. 6 is an enlarged cross section of the automatic control on the line 6—6 of Fig. 5; Fig. 7 is a sectional plan view of the same on the line 7—7 of Fig. 6; Fig. 8 is an enlarged side elevation of the segmental gear attached to the steering arm, part being shown in section.

The adjustable spot light is in the form of a lamp 10 of any approved construction and having its casing 11 mounted in a fork 12 provided with a vertical pivot 13 mounted to turn and to slide up and down in a bearing 14 formed on a bracket 15 attached to one side of the wind shield frame 16 of the automobile, as plainly indicated in Figs. 1, 2 and 5. The lower end of the pivot 13 is provided with a clutch member 17 normally engaging a clutch member 18 formed on the upper end of the hub 19 of a bevel gear wheel 20 extending within a casing 21 attached to the bearing 14, the said hub 19 being mounted to turn within the bearing 14. The bevel gear wheel 20 is in mesh with a bevel gear wheel 22 journaled on the casing 21 and connected with the upper end of a flexible shaft 23 adapted to be driven from the steering gear of the automobile by a suitable automatic controlling device, such, for instance, as shown in Figs. 1 and 2 or the one illustrated in Figs. 5 to 8.

The controlling device shown in Figs. 1 and 2 is arranged as follows: The lower end of the flexible shaft 23 is connected with a worm wheel 24 mounted to turn in a casing 25 held on the bearing 26 of the steering post 27 under the control of the operator turning the hand wheel 28 in the usual manner. The worm wheel 24 is in mesh with a worm 30 secured on the steering post 27 so that when the latter is turned a rotary motion is given to the flexible shaft 23 which by the gear wheels 22 and 20 and the clutch members 17 and 18 cause the pivot 13 to turn, thus turning the lamp 10 either to the right or to the left according to the direction in which the automobile is steered at the time, the lamp 10 illuminating the roadway ahead when the vehicle travels on a straight road or makes turns.

Normally the clutch member 17 is held in engagement with the clutch member 18 by the weight of the lamp 10 and by the action of a spring 40 held on the lower end of a rod 41 extending centrally through the bevel gear wheel 20 and its hub 19 and screwing into the pivot 13. One end of the spring 40 abuts against the face of the gear wheel 20 and the other end of the spring rests on a washer 42 carried on the lower end of the rod 41.

When the driver desires to turn the lamp 10 independently of the automatic control just described, the following arrangement is made: The pivot 13 is pivotally connected with a hand lever 45 within convenient reach of the driver in charge of the automobile, and the lever 45 is provided with a set screw 46 resting on the top flange 47 formed on the bearing 14 to provide a fulcrum for the lever 45. When the operator bears down on the hand lever 45 the pivot 13 is raised against the tension of the spring 40 and in doing so the clutch member 17 moves out of engagement with the clutch member 18 thus disconnecting the pivot 13 from the automatic control previously described (see Fig. 4). The operator now can swing the lever 45 around so as to turn the pivot 13 and with it the lamp 10 sidewise to illuminate signs, number plates or other parts along the side of the roadway at the time the automobile travels along a straight road or makes a turn or is at a standstill. When the operator releases the pressure on the hand lever 45 the pivot 13 slides downward aided by the weight of the lamp 10 and the spring 40 to reëngage the clutch member 17 with the clutch member 18. The upward sliding movement of the pivot 13 is limited by a set screw 50 screwing in the bearing 14 and engaging an annular groove 51 in the peripheral face of the pivot 13.

From the foregoing it will be seen that by the arrangement described the lamp 10 is automatically turned with the steering wheels, on the operator turning the hand wheel 28 so as to illuminate the roadway ahead on making turns. When it is desired to use the spot light for illuminating signs and other objects along the roadway, it is only necessary for the operator to reach over and bear down on the hand lever 45 and then swing the same around so as to swing the lamp 10 around with a view to direct the rays of light onto signs or other objects.

It will be noticed that a very quick action is had for illuminating the signs alongside the roadway by the driver, especially while the automobile travels along the road, without requiring stopping or slacking up.

The automatic controlling device shown in Figs. 5 to 8, inclusive, is arranged as follows: The lower end of the flexible shaft 23 is connected with the shaft 60 of a pinion 61 in mesh with a segmental gear wheel 62 attached to or formed on a bracket 63 adjustably clamped or otherwise secured to the steering arm 64 of the usual steering gear of the automobile so that when a swinging motion is given to the steering arm 64 on the driver turning the steering wheel 28 then the segmental gear wheel 62 turns the pinion 61 and hence the flexible shaft 23 to turn the lamp 10 to the right or left according to the direction in which the automobile is steered at the time and as previously explained. The shaft 60 of the pinion 61 is journaled in a bearing 70 provided with an arm 71 adjustably secured by a bolt 72 to a bracket 73 attached to the chassis 74 of the automobile. The bolt 72 extends through registering slots 75 in the arm 71 and bracket 73 to allow convenient adjustment of the arm 71 to properly engage the pinion 61 with the segmental gear wheel 62. The bracket 63 carrying the segmental gear wheel 62 extends across the front of the steering arm 64 and is preferably provided with transverse bolts 65 engaging a clamping plate 66 extending across the back of the steering arm 64 to permit of adjustably clamping the bracket 63 in place on the steering arm 64. The sides of the bracket 63 are provided with set screws 67 adapted to engage the side edges of the steering arm 64 to permit proper lining up of the segmental gear wheel relatively to the pinion 61.

Although I have shown two forms of the means for rotating the flexible shaft 23 from the steering gear of the automobile, I do not limit myself to the same, as other means may be devised to accomplish the same result.

Having thus described my invention, I claim as new and desire to secure by Letters Patent:

1. An adjustable spot light for automobiles and other vehicles, comprising a lamp having a pivot, a bearing in which the pivot of the lamp is mounted to turn and slide, gearing in the bearing, a clutch connecting one of the gears of the gearing with the pivot of the lamp, gearing driven from the steering gear of the vehicle, a shaft connecting the last-named gearing with the first gearing, and manually controlled means for sliding the pivot of the lamp from the said gearing.

2. An adjustable spot light for automobiles and other vehicles, comprising a lamp having a pivot, a bearing in which the said pivot is mounted to turn and to slide in the direction of the axis of the pivot, and a hand lever pivotally connected with the said pivot and fulcrumed on the said bearing to raise and lower the lamp and to turn the same.

3. An adjustable spot light for automobiles and other vehicles, comprising a lamp having a pivot, a bearing in which the said pivot is mounted to turn and to slide in the direction of the axis of the pivot, and a hand lever pivotally connected with the said pivot and provided with a set screw resting on the said bearing.

4. An adjustable spot light for automobiles and other vehicles, comprising a bracket adapted to be attached to the vehicle and provided with a bearing, a lamp having a pivot mounted to turn and to slide in the said bearing, a gearing in the said bearing, a clutch normally connecting the said pivot with the said gearing, a flexible shaft connected with the said gearing, a driving gear connected with the said flexible shaft and driven from the steering gear of the vehicle, and a hand lever mounted to swing on the bearing as its fulcrum and connected with the said pivot to permit of lifting the latter to disconnect the members of the clutch and to allow of turning the lamp independent of the gearing.

5. An adjustable spot light for automobiles and other vehicles, comprising a bracket adapted to be attached to the vehicle and provided with a bearing, a lamp having a pivot mounted to turn and to slide in the said bearing, a gearing in the said bearing, a clutch normally connecting the said pivot with the said gearing, a flexible shaft connected with the said gearing, a driving gear connected with the said flexible shaft and driven from the steering gear of the vehicle, a hand lever mounted to swing on the bearing as its fulcrum and connected with the said pivot to permit of lifting the latter to disconnect the members of the clutch and to allow of turning the lamp independent of the gearing, and means for limiting the sliding movement of the said pivot.

6. An adjustable spot light for automobiles and other vehicles, comprising a lamp having a pivot, a bearing in which the said pivot is mounted to turn and to slide in the direction of the axis of the pivot, a hand lever pivotally connected with the said pivot and provided with a set screw resting on the said bearing, and means for limiting the sliding movement of the said pivot in the said bearing.

7. An adjustable spot light for automobiles and other vehicles, comprising a bracket adapted to be attached to the vehicle and provided with a bearing, a lamp having a pivot mounted to turn and to slide in the said bearing, a gearing in the said bearing, a clutch normally connecting the said pivot with the said gearing, a flexible shaft connected with the said gearing, a driving gear connected with the said flexible shaft and driven from the steering gear of the vehicle, a hand lever mounted to swing on the bearing as its fulcrum and connected with the said pivot to permit of lifting the latter to disconnect the members of the clutch and to allow of turning the lamp independent of the gearing, and a spring connected with the said pivot to return the latter on releasing the hand lever to reëngage the clutch.

8. An adjustable spot light for automobiles and other vehicles, comprising a lamp mounted to turn and slide on the vehicle, a gearing with one of the gears of which the lamp has a detachable interlocking engagement, said gearing being connected with the said lamp for turning the same, the gearing including a flexible shaft, a pinion attached to the said flexible shaft, and a segmental gear wheel in mesh with the said pinion, and attached to a movable part of the steering mechanism of the vehicle, and means for sliding the lamp to disengage it from said gearing.

9. An adjustable spot light for automobiles and other vehicles, comprising a lamp mounted to turn on the vehicle, a gearing connected with the said lamp for turning the same, the gearing including a flexible shaft, a pinion attached to the said flexible shaft, a segmental gear wheel in mesh with the said pinion, a bracket on the said segmental gear wheel and having means for attaching it to the steering arm of the steering gear of the vehicle, a bearing for the said pinion and provided with an arm, and a bracket attached to the chassis of the automobile and on which the said bearing arm is adjustably secured.

In testimony whereof I have signed my name to this specification in the presence of two subscribing witnesses.

GILBERT HENRY JOHNSON, Jr.

Witnesses:
HARRY MENDEL,
ELIAS L. GLOUSKIN.